March 26, 1940.  W. F. GOFF  2,194,850
PNEUMATIC TIRE VALVE
Filed May 2, 1938  2 Sheets-Sheet 1

Inventor
William F. Goff
By Lloyd W. Patch
Attorney

March 26, 1940. W. F. GOFF 2,194,850
PNEUMATIC TIRE VALVE
Filed May 2, 1938 2 Sheets-Sheet 2

Inventor
William F. Goff
By Lloyd W. Patch
Attorney

Patented Mar. 26, 1940

2,194,850

UNITED STATES PATENT OFFICE 2,194,850

PNEUMATIC TIRE VALVE

William F. Goff, Akron, Ohio, assignor to The Ohio Injector Company, Wadsworth, Ohio, a corporation of Ohio Application May 2, 1938, Serial No. 205,616

1 Claim. (Cl. 251—144)

This invention relates to improvements in pneumatic tire valves, and it has to do primarily with a valve stem and valve structure of a type suitable for use with inflatable tires and other inflatable articles.

One object of the invention is to provide a valve structure which lends itself readily to inexpensive manufacture, the parts being adaptable for production with automatic machinery, and which has its parts so associated that it can be readily and quickly assembled.

A further object is to provide a valve structure capable of being readily applied to and removed from the valve stem of an inflatable tire or tube or other element, with which stem the parts of the valve structure are assembled and are themselves connected together without cementing or vulcanizing or other special operations.

Another object is to embody with a valve core or body structure insertable within an opening in a rubber or other yieldable valve stem of a pneumatic tire, tube, or the like, clamping means readily applied with a simple operation to positively clamp and hold the valve structure in place, and easily releasable to leave the valve structure free and unsecured for removal and replacement, whereby although it is thus firmly attached and readily detachable, it is held against casual or accidental displacement, and may be removed and replaced, as desired, without the use of special tools or appliances.

With these and other objects in view, as will hereinafter appear, the invention contemplates a valve structure including a valve stem of yieldable material such as rubber, having an axial passage formed with a shoulder, a valve body inserted within such passage and provided adjacent to one end with an offstanding flange for engagement with the shoulder and its other end extending exteriorly of the stem, and a ferrule-like member or sleeve having a skirt for engagement with the exterior surface of the stem and an apertured end closure engageable with the end of the stem, the exteriorly extending end of the body and the aperture of the ferrule closure being formed for adjustable interattachment to exert body-securing pressure upon the portions of said stem engaged by said flange and ferrule; and the invention contemplates, further, a valve pin structure and assembly, as will be explained hereinafter more fully and finally claimed.

In the accompanying drawings illustrating the invention, in the several figures of which like parts are similarly designated, Figure 1 is a perspective view showing a tire valve and stem structure made in accordance with the present invention, a portion of a tire tube being shown therewith.

Figure 1:
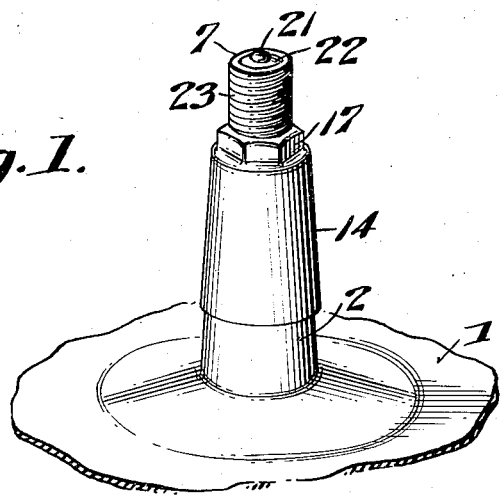
Figure 2:
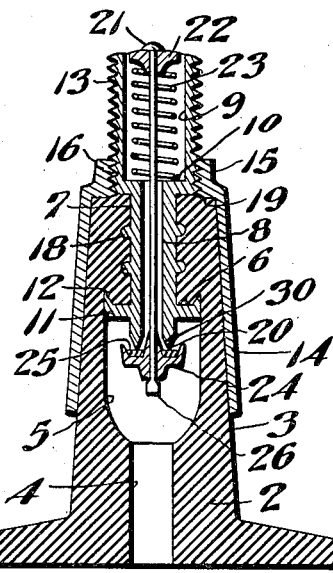
Fig. 2 is an enlarged axial sectional view of the parts illustrated in Fig. 1.

The invention makes possible construction of an inner tube or pneumatic tire, or other inflatable article, with a rubber or other yieldable stem formed as a part thereof or attached thereto, and adapted to permit mounting and assembly and securing of a valve core or body and valve pin structure in conjunction with this stem, in such manner and association that the valve core or body and with it the valve pin structure can be readily put in place and removed, and when in place will be positively clamped and held in desired relation with respect to the stem and thus retained against casual or accidental displacement, and in a manner to prevent leakage through the stem around the valve core or body.

The invention is illustrated in the drawings and will be hereinafter described in its application to a pneumatic inner tube or tire, but it will of course be understood that it is susceptible of other adaptation, as hereinbefore intimated. Consequently the present disclosure is intended only as illustrative.

The usual inner tube or tire 1 carries the stem 2 which extends from it in the customary manner, this stem being of rubber or other suitable yieldable material, and being formed integrally with or affixed to the tube 1, or constructed and associated in any other manner found desirable and suitable for the purpose. The valve stem 2 is preferably made slightly tapered on its outer wall 3, and is thus gradually reduced in diameter toward its outer end. The valve stem 2 has an axial through passage 4 provided with an enlargement 5 spaced inwardly from the outer end of the stem and formed to provide an inwardly faced shoulder 6.

The valve pin structure, hereinafter more fully described, is associated with and carried by a tubular core or body 7, and this core or body 7 has an axial opening or passage made as a relatively small bore 8 in the inner part of the body, and a relatively larger bore 9 in the outer part of the body, a bearing shoulder 10 being thus provided at the junction of these two bores. The tubular valve body 7 thus formed has its outer diameter reduced in the region of the bore 8 to provide a substantially annular offstanding flange 11 adjacent to its inner end, this flange 11 being shaped on its outer face to form a bearing surface, and being preferably cupped or recessed to provide a clamping bead or ring 12.

This tubular core or body 7 may be made of brass rod or tube stock, or of other suitable material, well adapted for production by automatic screw machines or the like.

The reduced portion of the core or body in the region of the bore 8 will be made of a diameter to fit snugly within the outer end of the passage or opening 4 through the stem 2, and the annular flange portion 11 has an external diameter substantially the same as that of the enlargement 5, while the portion of the body in the region of the larger bore 9 has an external diameter which may, if desired, correspond with the external diameter of the annular flange portion 11, but, in any event, greater than the external diameter of the body in the region of the bore 8. With the body 7 formed in this manner, it is possible to stretch the yielding stem 2 sufficiently to permit insertion of the flange 11 into and through the outer end portion of the passage 4, so that this flange will lie within the enlargement 5, and the material of the stem will contract around the reduced portion of the body between its flange 11 and the portion of larger diameter at its outer end. In this relation, the flange 11 faces the shoulder 6 and the bead or ring 12 is in position to engage and embed in the shoulder 6.

It is preferable that substantially the entire outer end or larger diameter portion of the body 7 extend from and beyond the end of the stem 2, and this extending portion is provided with means such as external screw threads 13 for interattachment with an outer sleeve or ferrule 14, preferably formed on a taper substantially conforming to the tapered exterior 3 of the stem 2, and provided at its outer end with an inturned apertured flange portion or closure the aperture of which may be provided with screw threads 16 complemental to the threads 13 on the tubular body 7. If desired, this sleeve or ferrule 14 may be provided with an exterior polygonal portion 17 adjacent to its end closure 15 to receive a wrench or pliers or other ordinary tool by which the sleeve or ferrule 14 may readily be rotated. Obviously, the sleeve 14 may be knurled, milled, or otherwise appropriately exteriorly roughened to furnish a good grip for the fingers or for a tool used for turning it.

In some instances it may be found desirable to provide spaced annular ribs or beads 18 upon the reduced portion of the body 7 so that leak stops or checks will be afforded when the body is in place within the stem.

After the body 7 has been inserted in the stem 2, as hereinbefore explained, the sleeve or ferrule 14 is fitted over the outwardly extending end of the body 7 with its open end encircling the stem 2, and is then rotated to turn its threaded portion 16 onto and down upon the threaded end 13 of the body, the sleeve or ferrule being thus brought down over the outer end of the stem 2 with the inner face or shoulder 19 of its end closure 15 engaged with the outer end of the stem 2, thus pulling upon the body to draw its flange 11 against the shoulder 6 and establish an airtight seal. The bead or ring 12 will at the same time be forced into the material of the stem 2 and will aid in sealing against air or fluid leakage, and the sleeve or ferrule 14 embracing the stem will confine this portion against expansion or pulling away and, due to its tapered formation, will compress the material of the stem into intimate, fluid-tight engagement with the body. Moreover, the sleeve or ferrule will serve to reinforce and strengthen and stiffen the outer portion of the stem and assembly.

The valve pin structure mounted in the valve core or body 7 serves to close and seal the passage 8—9 therethrough. At the inner end of the body 7 there is provided a valve seat 20, preferably so spaced from the flange portion 11 as to be located within the enlargement 5. The valve pin 21 is fitted through the bore 8 to extend out of the inner end around which the valve seat 20 is provided, and the outer end of this pin 21 extends axially into and through the enlarged bore portion 9. A washer 22 is mounted on the outer end of the pin 21 to substantially close the outer end of the bore 9, and yet to be freely movable axially of said bore and to provide sufficient clearance for passage of air. A helical spring 23 is fitted around the stem 21, within the bore 9, to bear at its ends between the shoulder 10 and the inner face of the washer 22, thus exerting resilient force upon the pin 21 tending to withdraw the inner end of this pin through the bore 8. At its inner end the pin 21 is provided with a valve cup 24 carrying a valve packing 25 for cooperation with the valve seat 20. The valve cup is shown as being fitted upon the inner end of the pin 21, with the extending end of the pin upset or flattened, as at 26, to hold the valve cup against displacement from the pin, although it will be apparent that the valve cup can be assembled and connected with the valve pin in any desired manner.

The valve pin structure as above described can be conveniently and cheaply made, and can be assembled with great facility and at minimum cost. In assembling, the valve pin 21 will be associated with the washer 22, and the spring 23 is then threaded over the free end of the pin 21 and the pin inserted axially within the passage of the body 7 so that the spring 23 is brought within the bore 9 to be confined between the washer 22 and the shoulder 10, and the inner end of the pin 21 extends through and beyond the bore 8 substantially centrally within the valve seat 20. The spring 23 is then compressed to give sufficient extension of the inner end of the pin 21 beyond the seat 20 to permit fitting of the valve cup 24 in the desired position, and then the valve cup is secured upon the pin by upsetting or flattening the end as at 26 or in any other desired manner. With this construction the parts are readily associated and assembled with simple operations and without the use of special complicated equipment or mechanism.

When the valve pin structure is thus assembled in the body 7 a complete valve core structure is provided, and this valve core structure may be inserted within the stem 2 as an entirety, and may be removed in like manner. Removal is readily accomplished by rotating the sleeve or ferrule 14 to release the threaded portion 16 thereof from the threaded end 13 of the body 7, and then by exerting inward pressure upon the body sufficient to disengage the flange 11 from the shoulder 8 and applying slight twisting and outward pulling force, the body can readily be removed from the passage of the stem 2.

Figure 8:
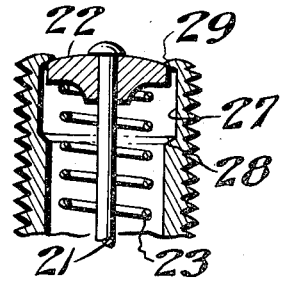
Fig. 8 is a view similar to Fig. 7 showing the air supply end of the valve core or body and valve pin assembly, illustrating a modified construction.

As is shown in Fig. 8, the tubular valve body may have the outer end of its bore slightly enlarged as at 27, the washer 22 on the valve pin being made of such diameter as to fit loosely within this enlarged portion 27 but large enough to engage with a shoulder 28 at the inner end of the enlargement 27 to prevent undue or excessive inward movement of the pin and valve assembly. If desired, the outer end of the tubular body can be slightly inwardly swaged, as at 29, to provide a guard flange over and around the edge of the washer 22. With this construction, excessive inward movement of the washer which might cause distortion of the spring or jamming of the valve is prevented, and thus possible damage from the use of excessive pressure to open the valve or from the use of an air chuck having a long pin, or damage from other causes, is prevented.

As the tubular valve body 7 has the passage therethrough formed by straight intercommunicating bores, without necessity for undercutting or peripheral enlargement, it will be appreciated that the formation of this passage can be readily and quickly accomplished with ordinary and simple boring operations upon an automatic screw machine, or with other like mechanism, and also it will be appreciated that the larger outer end and the clamping flange portions 11 being of substantially uniform diameter will permit economical use of the smallest adaptable size of metal rod, or of other material, and the operations for providing the exterior configuration can also be accomplished in accordance with ordinary machine shop practice by the use of automatic screw machines or other automatic machines or mechanism.

While the valve pin 21 will ordinarily remain substantially centered within the smaller bore 8, in some instances it may be found desirable to countersink or form the inner open end of the bore 8 with an inwardly contracted taper 30, and to provide on the valve cup a complementally tapered extension 31 which will positively assure centering of the parts and full and proper seating of the valve.

The threaded extending end 13 of the tubular valve body provides for use and application of the conventional valve cap, or in fact a valve cap of any other structure or any desired form or character. The sleeve or ferrule 14 is preferably of such length as substantially to embrace or surround the enlargement 5 of the stem 2, but its length may of course be varied. Likewise, the length of the stem may be increased or diminished from the general proportions illustrated, to suit the requirements of use.

Figure 9:
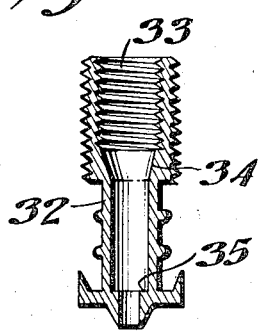
Fig. 9 illustrates a modified construction of core or body adapted to receive conventional valve insides.
Figure 3:
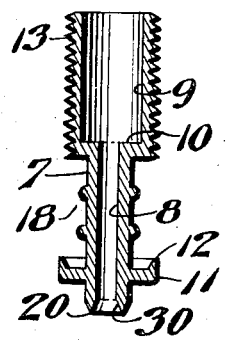
Fig. 3 is an axial sectional view of the tubular valve core or body.
Figure 6:
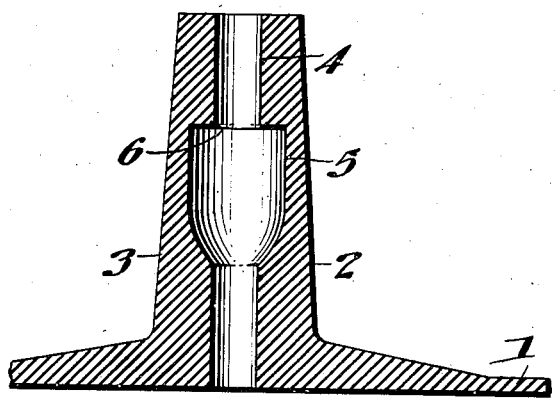
Fig. 6 is an axial sectional view of the rubber valve stem.
Figure 4:
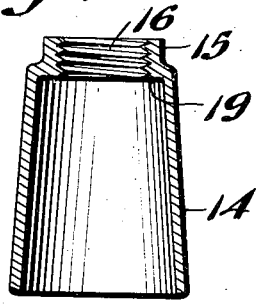
Fig. 4 is an axial sectional view of the outer clamping sleeve or ferrule.
Figure 7:
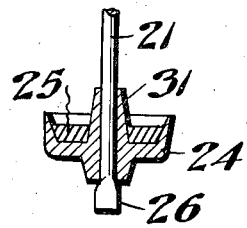
Fig. 7 is an enlarged fragmentary sectional view of the valve and pin assembly.
Figure 5:
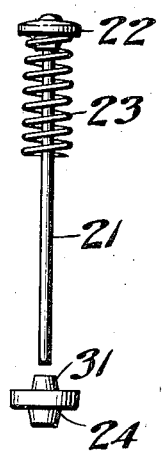
Fig. 5 is a view in elevation showing the valve pin and associated parts ready for assembly.

With the modified construction illustrated in Fig. 9 it is possible to use the ordinary replaceable valve insides now manufactured and sold for use with pneumatic tires and the like. In this modification the tubular body 32 has an enlarged and internally screw threaded bore or opening 33 at its outer end to receive valve insides of such ordinary commercial form, and the valve insides can be screwed into this threaded opening. A tapered seat 34 is provided for cooperation with a correspondingly shaped portion of one form of commercial valve insides, and a shoulder 35 is provided to adapt the body 32 to receive commercial valve insides of another type. With this modified construction, my invention is adaptable for employment of standard replaceable valve insides, and the construction and assembly of the parts are such that when associated with a pneumatic tire or other inflatable article there is no possibility of such accidental or casual displacement or separation of the parts as will permit leaking.

Various changes and modifications including and in addition to those hereinbefore specifically referred to are considered to be within the spirit of the invention and the scope of the following claim.

I claim:

A pneumatic tire valve, comprising a tubular valve body having a longitudinal bore terminating in a valve seat and adapted to receive a valve pin, said pin fitted slidably through and projecting from the inner end of said bore adjacent to said seat, a valve on the projecting end of said pin, a head on the opposite end thereof, and a spring associated with said stem and body and functioning normally to urge the valve to a closed position against said seat, the bore of said body adjacent to the valve seat being countersunk, and said valve including a cup member provided with an axially tapered extension apertured to receive and pass said pin, and an annular seating element retained within said cup member and embracing said extension, said extension guided within the countersunk portion of said bore and centering the valve in closing relation to said seat.

WILLIAM F. GOFF.